(12) United States Patent
Unagami et al.

(10) Patent No.: US 10,135,794 B2
(45) Date of Patent: Nov. 20, 2018

(54) CRYPTOGRAPHIC COMMUNICATION DEVICE, CRYPTOGRAPHIC COMMUNICATION METHOD, AND NON-TRANSITORY STORAGE MEDIUM STORING PROGRAM

(71) Applicant: Panasonic Intellectual Property Management Co., Ltd., Osaka (JP)

(72) Inventors: Yuji Unagami, Osaka (JP); Manabu Maeda, Osaka (JP); Hideki Matsushima, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 190 days.

(21) Appl. No.: 14/923,889

(22) Filed: Oct. 27, 2015

(65) Prior Publication Data

US 2016/0057114 A1 Feb. 25, 2016

Related U.S. Application Data

(63) Continuation of application No. PCT/JP2014/002588, filed on May 16, 2014.
(Continued)

(51) Int. Cl.
*H04L 29/06* (2006.01)
*H04L 9/30* (2006.01)
(Continued)

(52) U.S. Cl.
CPC ............ *H04L 63/0428* (2013.01); *H04L 9/30* (2013.01); *H04L 63/0442* (2013.01);
(Continued)

(58) Field of Classification Search
CPC ... H04L 63/0428; H04L 9/30; H04L 63/0442; H04L 63/061; H04L 63/1466; H04W 12/04; H04W 12/08
See application file for complete search history.

(56) References Cited

U.S. PATENT DOCUMENTS

2005/0238172 A1   10/2005   Tamura
2007/0130071 A1*   6/2007   Suzuki .................. G06F 21/602
                                                       705/50

FOREIGN PATENT DOCUMENTS

JP   2002-099430   4/2002
JP   2002-304351   10/2002
(Continued)

OTHER PUBLICATIONS

Hutzelman et al. (RFC 4462, May 2006, 29 pages).*
(Continued)

*Primary Examiner* — Oleg Korsak
(74) *Attorney, Agent, or Firm* — Greenblum & Bernstein, P.L.C.

(57) ABSTRACT

When a device is connected to a home gateway, if a common connection method is selected, a not-high-security connection method is inevitably selected even for a connection of a high-capability device. In a cryptographic communication system according to the present disclosure, it is possible to select a high-security connection method taking into account a processing capability of the device. Furthermore, the connection method is allowed to be updated and thus when the security level of the connection method hitherto selected is imperiled, the connection method may be updated so as to maintain a high security level.

9 Claims, 25 Drawing Sheets

Related U.S. Application Data

(60) Provisional application No. 61/845,653, filed on Jul. 12, 2013.

(51) Int. Cl.
*H04W 12/04* (2009.01)
*H04W 12/08* (2009.01)

(52) U.S. Cl.
CPC ......... *H04L 63/1466* (2013.01); *H04W 12/04* (2013.01); *H04W 12/08* (2013.01)

(56) References Cited

FOREIGN PATENT DOCUMENTS

| | | |
|---|---|---|
| JP | 2005-311653 | 11/2005 |
| JP | 2007-324767 | 12/2007 |

OTHER PUBLICATIONS

International Search Report of PCT application No. PCT/JP2014/002588 dated Jul. 22, 2014.
"Wi-Fi Certified Wi-Fi Protected Setup" Wi-Fi Alliance, Dec. 2010.
Elaine Barker et al., "Recommendation for Pair-Wise Key Establishment Schemes Using Discrete Logarithm Cryptography" NIST Special Publication 800-56A Revision 2, May 2013.

\* cited by examiner

FIG. 3

| DEVICE ID | KEY EXCHANGE METHOD | | SHARED KEY |
|---|---|---|---|
| | ECDH 160 bit | ECDH 256 bit | |
| DEVICE ID 1 | ○ | | 01234... |
| DEVICE ID 2 | | ○ | 98765... |
| DEVICE ID 3 | ○ | | 19283... |
| ... | | | |

FIG. 6

| HGWID | DEVICE ID | KEY EXCHANGE METHOD | | HISTORY INFORMATION |
|---|---|---|---|---|
| | | ECDH 160 bit | ECDH 256 bit | |
| HGWID1 | DEVICE ID 1 | ○ | | HISTORY INFORMATION 1 |
| | DEVICE ID 2 | | ○ | HISTORY INFORMATION 2 |
| | DEVICE ID 3 | ○ | | HISTORY INFORMATION 3 |
| ... | ... | | | |

FIG. 11

| DEVICE ID | KEY EXCHANGE METHOD | | SHARED KEY | INFORMATION ON UPDATING |
|---|---|---|---|---|
| | ECDH 160 bit | ECDH 256 bit | | UPDATING OF SHARED KEY |
| DEVICE ID 1 | — | ○ | 01235··· | ○ |
| DEVICE ID 2 | — | ○ | 98765··· | — |
| DEVICE ID 3 | — | ○ | 37465··· | ○ |
| ... | | | | |

FIG. 12

| HGWID | DEVICE ID | KEY EXCHANGE METHOD | | HISTORY INFORMATION | INFORMATION ON UPDATING (UPDATING OF SHARED KEY IS COMPLETED) |
|---|---|---|---|---|---|
| | | ECDH 160 bit | ECDH 256 bit | | |
| HGWID1 | DEVICE ID 1 | — | ○ | HISTORY INFORMATION 1 | ○ |
| | DEVICE ID 2 | — | ○ | HISTORY INFORMATION 2 | — |
| | DEVICE ID 3 | — | ○ | HISTORY INFORMATION 3 | ○ |
| | ... | | | | |
| ... | | | | | |

FIG. 14

| DEVICE ID | KEY EXCHANGE METHOD | | SHARED KEY | INFORMATION ON UPDATING | |
| --- | --- | --- | --- | --- | --- |
| | ECDH 160 bit | ECDH 256 bit | | FIRMWARE | UPDATING OF SHARED KEY |
| DEVICE ID 1 | ○ | | 01234··· | | |
| DEVICE ID 2 | | ○ | 98765··· | | |
| DEVICE ID 3 | ○ | | 19283··· | | |
| ··· | | | | | |

FIG. 17

| HGWID | DEVICE ID | KEY EXCHANGE METHOD | | HISTORY INFORMATION | INFORMATION ON UPDATING | |
|---|---|---|---|---|---|---|
| | | ECDH 160 bit | ECDH 256 bit | | FIRMWARE | UPDATING OF SHARED KEY |
| HGWID1 | DEVICE ID 1 | ○ | | HISTORY INFORMATION 1 | | |
| | DEVICE ID 2 | | ○ | HISTORY INFORMATION 2 | | |
| | DEVICE ID 3 | ○ | | HISTORY INFORMATION 3 | | |
| | ... | | | | | |
| ... | | | | | | |

FIG. 19

| DEVICE ID | KEY EXCHANGE METHOD | | SHARED KEY | INFORMATION ON UPDATING | |
|---|---|---|---|---|---|
| | ECDH 160 bit | ECDH 256 bit | | FIRMWARE | UPDATING OF SHARED KEY |
| DEVICE ID 1 | — | ◯ | 01235··· | ◯ | ◯ |
| DEVICE ID 2 | — | ◯ | 98765··· | ◯ | — |
| DEVICE ID 3 | — | ◯ | 37465··· | ◯ | ◯ |
| ··· | | | | | |

FIG. 20

| HGWID | DEVICE ID | KEY EXCHANGE METHOD | | HISTORY INFORMATION | INFORMATION ON UPDATING | |
|---|---|---|---|---|---|---|
| | | ECDH 160 bit | ECDH 256 bit | | FIRMWARE | UPDATING OF SHARED KEY |
| HGWID1 | DEVICE ID 1 | — | ○ | HISTORY INFORMATION 1 | ○ | ○ |
| | DEVICE ID 2 | — | ○ | HISTORY INFORMATION 2 | ○ | — |
| | DEVICE ID 3 | — | ○ | HISTORY INFORMATION 3 | ○ | ○ |
| | ... | | | | | |
| ... | | | | | | |

FIG. 21

| DEVICE ID | KEY EXCHANGE METHOD | | SHARED KEY | INFORMATION ON UPDATING |
|---|---|---|---|---|
| | ECDH 160 bit | ECDH 256 bit | | UPDATING OF SHARED KEY |
| DEVICE ID 1 | — | ○ | 01234··· | |
| DEVICE ID 2 | — | ○ | 98765··· | ○ |
| DEVICE ID 3 | — | ○ | 37465··· | ○ |
| ··· | | | | |

FIG. 22

| DEVICE ID | KEY EXCHANGE METHOD | | SHARED KEY | INFORMATION ON UPDATING | |
|---|---|---|---|---|---|
| | ECDH 160 bit | ECDH 256 bit | | FIRMWARE | UPDATING OF SHARED KEY |
| DEVICE ID 1 | — | ○ | 01235… | ○ | |
| DEVICE ID 2 | — | ○ | 98765… | ○ | — |
| DEVICE ID 3 | — | ○ | 37465… | | ○ |
| ⋮ | | | | | |

FIG. 24

| TYPE OF NETWORK | STANDARD PROCESSING TIME (msec) |
|---|---|
| Ethernet | 500 |
| Wi-Fi | 1000 |
| SPECIFIED LOW POWER RADIO | 1500 |

FIG. 25

| DEVICE ID | KEY EXCHANGE METHOD | | SHARED KEY | TYPE OF NETWORK |
|---|---|---|---|---|
| | ECDH 160 bit | ECDH 256 bit | | |
| DEVICE ID 1 | ○ | | 01234··· | Ethernet |
| DEVICE ID 2 | | ○ | 98765··· | Wi-Fi |
| DEVICE ID 3 | ○ | | 19283··· | SPECIFIED LOW POWER RADIO |
| ··· | | | | |

CRYPTOGRAPHIC COMMUNICATION DEVICE, CRYPTOGRAPHIC COMMUNICATION METHOD, AND NON-TRANSITORY STORAGE MEDIUM STORING PROGRAM

BACKGROUND

1. Technical Field

The present disclosure relates to, in a communication system in which a device and a home gateway are connected, a cryptographic communication device and a cryptographic communication method for controlling a connection between devices using cryptography.

2. Description of the Related Art

In recent years, it has been expected to provide service such that a household electrical appliance or a AV device in a home is connected to a network and service is provided using various kinds of history information collected therefrom to a cloud server. In this service, a home gateway is installed in a home and transmission of history information from a household electrical appliance to a cloud server is performed through the home gateway. By securely setting the connection between the home gateway and the household electrical appliance, communication within a home is controlled so as to prevent information from being leaked via a wireless communication and prevent an unauthorized connection to a network in a home from being made by spoofing or the like.

Wi-Fi Alliance has established a standard called Wi-Fi Protected Setup that allows it to easily make a connection between devices (Wi-Fi Alliance, "Wi-Fi CERTIFIED Wi-Fi Protected Setup: Easing the User Experience for Home and Small Office Wi-Fi Networks (2010)", [online] December, 2010 [Searched Apr. 18, 2014], Internet <URL:http://www.wi-fi.org/ja/file/wi-fi-certified-wi-fi-protected-setup %E2%84% A2-easing-the-user-experience-for-home-and-small-office-wi>). As described above, it is possible to realize the secure connection between the home gateway and the household electrical appliance.

In a conventional Wi-Fi wireless connection, a plurality of devices may be connected to an access point. Japanese Patent No. 4606055 discloses a method of selecting a cryptography method with a highest security level from cryptography methods employable in common by devices located on a network.

SUMMARY

However, devices connected to an access point corresponding to a home gateway may include not only a device with a high processing capability such as a personal computer, a portable terminal, or the like but also various kinds of household electrical appliances in a home. That is, devices allowed to be connected may include a household electrical appliance with a low processing capability compared with that of a personal computer, a portable terminal, or the like. In this situation, in the method disclosed in Japanese Patent No. 4606055, a cryptography method that can be handled even by a household electrical appliance with a low processing power is used as a cryptography method usable in common, and thus a cryptography method with a low security level is selected even for a device with a high processing capability.

One non-limiting and exemplary embodiment provides a cryptographic communication system in which a device is connected to a home gateway in a secure manner adapted to the capability of the device.

In one general aspect, the techniques disclosed here feature that a gateway apparatus that, in a communication system including a device and a gateway apparatus, communicates with the device by using a public key cryptography method, including one or more memories, and circuitry which, in operation, stores a plurality of public key pairs each including a secret key and a public key corresponding to the secret key and having a different key length, data for verification to the device to be registered, receives, from the device to be registered, information indicating a result of a cryptographic process using the data for verification, measures a processing time indicating a time spent until the information indicating the result of the cryptographic process is received since the data for verification is transmitted, verifies whether or not the received information is valid, wherein in a case where the circuitry verifies that the received information is valid, one public key pair is selected from the plurality of public key pairs depending on the measured processing time, and the circuitry performs a key exchange with the device by the public key cryptography method using the selected one public key pair.

It should be noted that general or specific aspects may be implemented as a system, a method, an integrated circuit, a computer program, a storage medium, or any selective combination of a system, an apparatus, a method, an integrated circuit, a computer program, and a storage medium.

With the cryptographic communication device and the cryptographic communication method according to the present disclosure, it makes it possible to select a proper connection method depending on a capability of a device. Thus, in the connection between a home gateway and a device, it is possible to select a high-security connection method when the capability of the device is high. The connection method is allowed to be updated. Therefore, in a case where an attacker gains a higher analysis capability, the connection method may be changed to a high-security connection method to achieve a high-security connection s between the home gateway and the device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of a device information management table of a home gateway according to the first embodiment;

FIG. 6 is a diagram illustrating an example of a device history information table of a cloud server according to the first embodiment;

FIG. 11 is a diagram illustrating an example of a device information management table of a home gateway according to the first embodiment;

FIG. 12 is a diagram illustrating an example of a device history information table of a cloud server according to the first embodiment;

FIG. 14 is a diagram illustrating an example of a device information management table of a home gateway according to the second embodiment;

FIG. 17 is a diagram illustrating an example of a device history information table of a cloud server according to the second embodiment;

FIG. 19 is a diagram illustrating an example of a device information management table of a home gateway according to the second embodiment;

FIG. 20 is a diagram illustrating an example of a device history information table of a cloud server according to the second embodiment;

FIG. 21 is a diagram illustrating an example of a device information management table of a home gateway according to a first modification;

FIG. 22 is a diagram illustrating an example of a device information management table of a home gateway according to a second modification;

FIG. 24 is a diagram illustrating an example of a standard processing time table according to the fourth modification; and FIG. 25 is a diagram illustrating an example of a device information management table according to the fourth modification.

DETAILED DESCRIPTION

Figure 1:
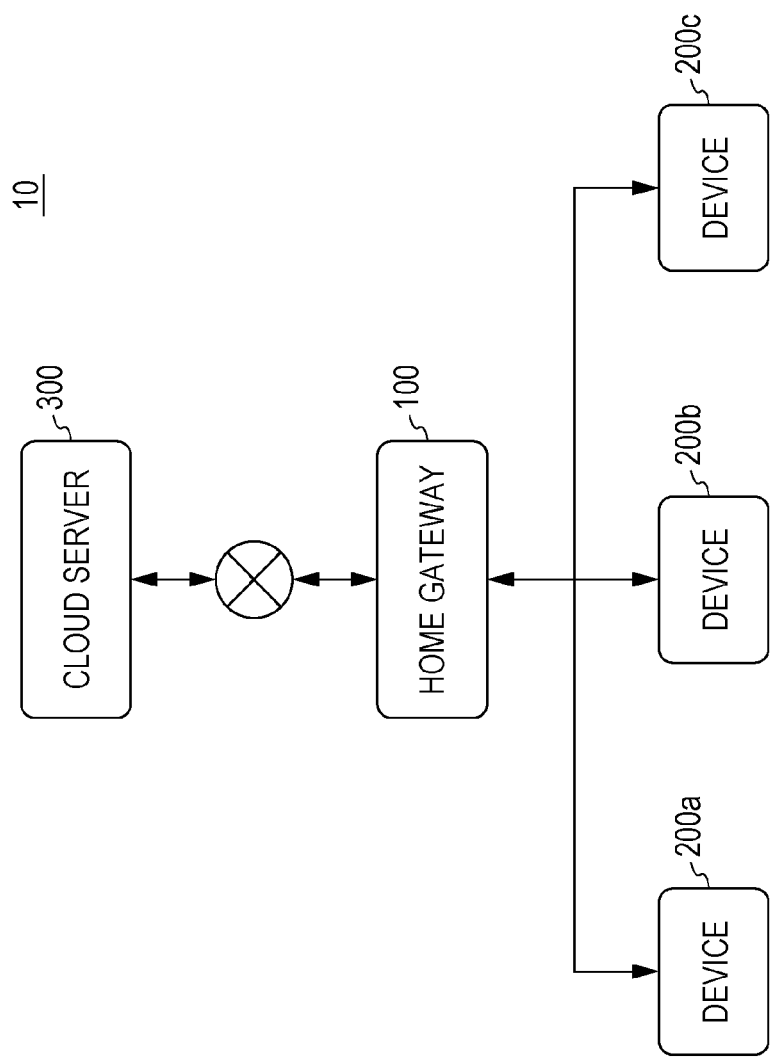
FIG. 1 is a diagram illustrating an overall configuration of a cryptographic communication system according to a first embodiment.

According to an aspect, the present disclosure provides a cryptographic communication device that communicates with one other cryptographic communication device by using a public key cryptography method, including a cryptographic key storage unit that stores a plurality of public key pairs each including a secret key and a public key corresponding to the secret key, a communication unit that transmits to the one other cryptographic communication device a command to perform a verification process for verifying an information processing capability of the one other cryptographic communication device and receives information indicating a result of the verification process from the one other cryptographic communication device, and a time measurement unit that measures a processing time indicating a time spent to perform the verification process, wherein each of the plurality of public key pairs has a different key length, one public key pair is selected from the plurality of public key pairs depending on the measured processing time, and a key exchange is performed with the one other cryptographic communication device by the public key cryptography method using the selected one public key pair.

Thus, when a home gateway, which is a cryptographic communication device, is connected to a device, which is one other cryptographic communication device, it is possible to select a connection method adapted to the processing capability of the device.

Furthermore, in the cryptographic communication device according to an aspect of the present disclosure, the cryptographic key storage unit stores two public key pairs that are different in key length, in a case where the processing time is longer than a predetermined time, the key exchange is performed with the one other cryptographic communication device using a public key pair having a shorter key length than a key length of the other one of the two public key pairs, and in a case where the processing time is shorter than the predetermined time, the key exchange is performed with the one other cryptographic communication device using a public key pair having a longer key length than a key length of the other one of the two public key pairs.

Thus, when the processing capability of the device is high, it is possible to select a high-security connection method. Furthermore, the connection method is allowed to be updated in a case where an attacker gains a higher analysis capability, the connection method is changed to a high-security connection method to achieve a high-security connection s between the home gateway and the device.

Furthermore, in the cryptographic communication device according to an aspect of the present disclosure, the processing time measured by the time measurement unit is a time period from a time when the command to perform the verification process is transmitted to a time when information indicating a result of the verification process is received.

Furthermore, in the cryptographic communication device according to an aspect of the present disclosure, the verification process is a process of performing a signature generation using a secret key having a shortest key length of the plurality of public key pairs.

Furthermore, in the cryptographic communication device according to an aspect of the present disclosure, the cryptographic key storage unit stores a public key pair that is for use in common by all devices and that has a key length longer than key lengths of the plurality of public key pairs, and the verification process is a process of performing an encryption process using the public key pair for use in common by all devices.

Furthermore, in the cryptographic communication device according to an aspect of the present disclosure, a shared key for use in common by the cryptographic communication device and the one other cryptographic communication device is generated by the key exchange and the generated shared key is stored in the cryptographic key storage unit.

Furthermore, in the cryptographic communication device according to an aspect of the present disclosure, in a case where firmware of the cryptographic communication device is updated so as to prohibit communication by the public key cryptography method using the selected one public key pair, communication by the public key cryptography method using the selected one public key pair is continued until the shared key is deleted from the cryptographic key storage unit.

According to an aspect, the present disclosure provides a cryptographic communication method for controlling a cryptographic communication device that communicates with one other cryptographic communication device using a public key cryptography method, including controlling a computer of the cryptographic communication device so as to manage a plurality of public key pairs each including a secret key and a public key corresponding to the secret key, transmit to the one other cryptographic communication device a command to perform a verification process for verifying an information processing capability of the one other cryptographic communication device, receive information indicating a result of the verification process from the one other cryptographic communication device, and measure a processing time indicating a time spent to perform the verification process, wherein each of the plurality of public key pairs has a different key length, the cryptographic communication method further including controlling the computer of the cryptographic communication device so as to select one public key pair from the plurality of public key pairs depending on the measured processing time, and perform a key exchange, with one other cryptographic communication device, by the public key cryptography method using the selected one public key pair.

According to an aspect, the present disclosure provides a non-transitory computer-readable storage medium storing a computer program that controls a cryptographic communication device that communicates with one other cryptographic communication device using a public key cryptography method, the computer program including controlling a computer of the cryptographic communication device so as to manage a plurality of public key pairs each including a secret key and a public key corresponding to the secret key, transmit to the one other cryptographic communication device a command to perform a verification process for verifying an information processing capability of the one other cryptographic communication device, receive information indicating a result of the verification process from the one other cryptographic communication device, and measure a processing time indicating a time spent to perform the verification process, wherein each of the plurality of public key pairs has a different key length, the computer program further including controlling the computer of the cryptographic communication device so as to select one public key pair from the plurality of public key pairs depending on the measured processing time, and perform a key exchange, with one other cryptographic communication device, by the public key cryptography method using the selected one public key pair.

According to an aspect, the present disclosure provides a cryptographic communication device that communicates with one other cryptographic communication device by using a public key cryptography method, including a cryptographic key storage unit that stores a plurality of public key pairs each including a secret key and a public key corresponding to the secret key, a communication unit that transmits to the one other cryptographic communication device a command to perform a verification process for verifying an information processing capability of the one other cryptographic communication device and receives information indicating a result of the verification process from the one other cryptographic communication device, and a time measurement unit that measures a processing time indicating a time spent to perform the verification process, wherein each of the plurality of public key pairs has a different processing load in terms of the cryptographic process, one public key pair is selected from the plurality of public key pairs depending on the measured processing time, and a key exchange is performed with the one other cryptographic communication device by the public key cryptography method using the selected one public key pair.

Hereinafter, referring to drawings, a cryptographic communication system according to embodiments of the present disclosure is described below. Note that each embodiment described below is for illustrating a preferable specific example of the present disclosure. That is, in the following embodiments of the present disclosure, values, shapes, materials, constituent elements, locations o the constituent elements and manners of connecting the constituent elements, steps, the order of steps, and the like are described by way of example but not limitation. The present disclosure is defined by descriptions of claims. Among constituent elements described in the following embodiments, those constituent elements that are not described in independent claims indicating highest-level concepts of the present disclosure are not necessarily needed in achieving the object of the present disclosure, but such constituent elements are used to achieve more preferable aspects.

First Embodiment

1. System Configuration

A cryptographic communication system 10 according to an embodiment of the present disclosure is described below with reference to drawings.

1.1 Overall Configuration of Cryptographic Communication System 10

FIG. 1 is a diagram illustrating an overall configuration of the cryptographic communication system 10 according to an embodiment of the present disclosure. The cryptographic communication system 10 includes a home gateway 100, devices 200, and a cloud server 300. The devices 200a to 200c are household electrical appliances that collects device history information, such as a television set, a video recorder, an air conditioner, a refrigerator, or the like.

Note that the device history information (also referred to as device history or history information) is history information in terms of a process, an operation, or the like performed by a device, an operation performed by a user on the device. The device history information may include various kinds of information obtainable from a device such as information indicating an operation state, an operation date/time, or the like of the device. Specific examples of the device history information include a television view history, video recorder timer information, a washing machine operation date/time, an amount of laundry, an opening/closing date/time of a refrigerator, the number of times a refrigerator is opened/closed, and the like. Note that the device history information is not limited to the information associated with the operation history, but the device history information may be other kinds of information associated with a device, such as a picture of an inside of a refrigerator, a gender of a user, or the like.

1.2 Configuration of Home Gateway 100

Figure 2:
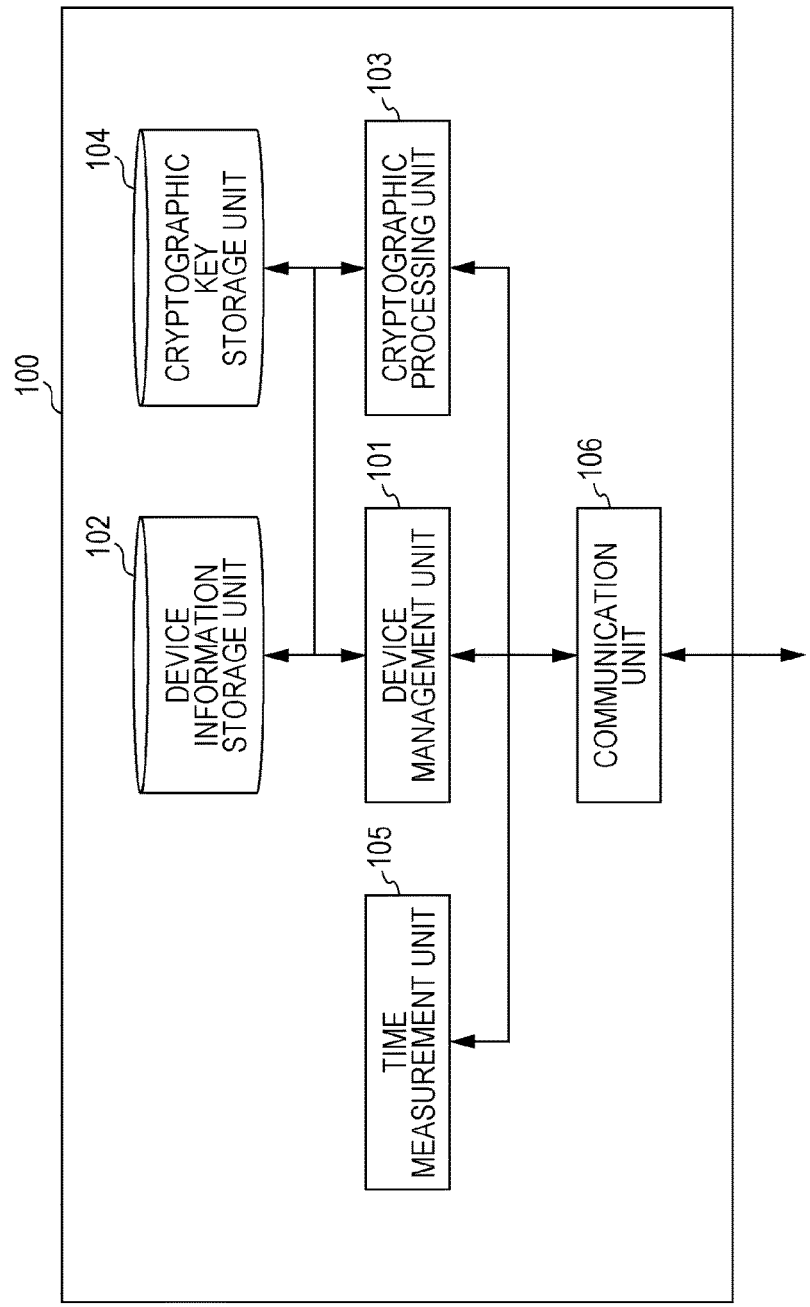
FIG. 2 is a diagram illustrating a configuration of a home gateway according to the first embodiment.

FIG. 2 is a diagram illustrating a configuration of the home gateway 100. The home gateway 100 includes a device management unit 101, a device information storage unit 102, a cryptographic processing unit 103, a cryptographic key storage unit 104, a time measurement unit 105, and a communication unit 106.

The device management unit 101 manages devices connected to the home gateway. When the device management unit 101 receives a connection request from a device, then, to determine a key exchange method of a shared key to be used in connection, the device management unit 101 sends a verification request to the cryptographic processing unit 103. When the device management unit 101 receives a verification request result from the cryptographic processing unit 103, the device management unit 101 determines a capability of the device from a time spent to the process (hereinafter also referred to as a processing time). In a case where the capability of the device is high, a key exchange method with a high security level is selected. The security level of the key exchange method can be evaluated mainly by a cryptographic algorithm used and its key length. In a case where the same cryptographic algorithm is used, the security levels increases with the key length although the processing load increases with the key length. In a case where the cryptographic algorithm is different, different key lengths may be needed to achieve a similar security level. For example, in the case of elliptic curve cryptography a shorter key length can provide a high security level similar to that provided by RSA cryptography with a longer key length.

A further explanation is given below referring to specific examples. In the following examples, it is assumed by way of example that a key exchange method based on elliptic curve cryptography is used, and selection candidates for secret keys have a key length (bit length) of either 160 bits or 256 bits. Note that a 256-bit secret key provides a higher security level. However, in a case where the key exchange method with the key length of 256 bits is used, it will take a long time for a device to handle the key exchange if the capability of the device is low. To select a proper key exchange method depending on the capability of a device, it is necessary to know the processing capability of the device. However, the home gateway 100 cannot determine the capability of the device until the key exchange is performed. To handle the above situation, the capability of the device is determined from a time spent to process a key length of, for example, 80 bits, smaller than that of a key length of a selection candidate. When the device management unit 101 acquires the processing time from the cryptographic processing unit 103, the device management unit 101 determines whether the processing time is equal to or shorter than a predetermined threshold value. In a case where the processing time is equal to or shorter than the predetermined threshold value, the device management unit 101 selects a high-security key exchange method and transmits a key exchange request to the cryptographic processing unit 103. When v receives a notification of completion of the key exchange, the device management unit 101 updates information on a device information management table in the device information storage unit 102.

The device information storage unit 102 manages information associated with devices connected to the home gateway 100. FIG. 3 is a diagram illustrating an example of the device information management table stored in the device information storage unit 102. The device information management table stores a device ID, a key exchange method selected when a key exchange is performed with a device, and a value of a shared key exchanged with the device. For example, in the present example of the device information management table, it is seen that a key exchange with a device with device ID1 is performed using an ECDH (Elliptic Curve Diffie-Hellman) key exchange method, which is an elliptic curve cryptography key exchange method, with a key length of 160 bits. It is also described that a value of the shared key is 01234 . . . .

The cryptographic processing unit 103 performs a cryptographic process in a key exchange with a device 200 or in an authentication process with a cloud server 300. When the cryptographic processing unit 103 receives a verification request on a device 200 from the device management unit 101, the cryptographic processing unit 103 performs a verification for selecting a key exchange method with the device 200. The cryptographic processing unit 103 generates a random number and transmits, to the device 200 via the communication unit 106, a request for a cryptographic process with a short key length. At the same time, the cryptographic processing unit 103 requests the time measurement unit 105 to start a timer. The cryptographic processing unit 103 receives a result of the cryptographic process from the device 200, controls the time measurement unit 105 to stop the timer, and acquires the processing time. The cryptographic processing unit 103 verifies the result of the cryptographic process using a cryptographic key with a short key length stored in the cryptographic key storage unit 104. In a case where the result of the cryptographic process is valid, the cryptographic processing unit 103 transmits the acquired processing time to the device management unit 101. When the cryptographic processing unit 103 receives a key exchange request from the device management unit 101, the cryptographic processing unit 103 performs a key exchange with the device 200 using a requested key exchange method. A description of the key exchange method may be found, for example, in Elaine Barker et al. "Recommendation for Pair-Wise Key-Establishment Schemes Using Discrete Logarithm Cryptography" [online] May 13, 2012, [Searched Apr. 17, 2014] National Institute of Standards and Technology, Internet <URL:http://nylpubs.nist-.govinistpubs/SpecialPublications/NIST.SP.800-56Ar2.pdf>, and thus a description thereof is omitted here. The cryptographic processing unit 103 stores the key shared via the key exchange in the device information storage unit 102 and the communication unit 106.

The cryptographic key storage unit 104 stores two or more public key pairs with different key lengths for each device 200. For example, in a case where public key pairs are of elliptic curve cryptography, secret keys of the public key pairs stored may have key lengths of 80 bits, 160 bits, 192 bits, 224 bits, 256 bits, and the like. A public key pair with the shortest key length of all public key pairs may be used only in verifying the capability of the device 200 and it may be excluded from selection candidates for the key exchange method. The short key length used in the verification of the capability may be any key length other than the longest key length of a plurality of public key pairs stored for each device in the cryptographic key storage unit 104. It may be desirable to employ the shortest key length. The cryptographic key storage unit 104 also stores a root public key certificate for use in verification of a public key certificate. Alternatively, a public key pair with a short key length for use in common may be possessed by all devices 200 and the home gateway 100. The public key pair for use in common by all devices may preferably have a shorter key length than the key lengths of the plurality of public key pairs for each device.

The time measurement unit 105 measures the time under the control of the cryptographic processing unit 103.

The communication unit 106 communicates with the devices 200 and the cloud server 300. In the communication with the cloud server 300, SSL (Secure Socket Layer) communication is performed. A certificate necessary for the SSL communication is recorded in the communication unit 106. The communication unit 106 also stores a shared key used in the encrypted communication with the device 200.

1.3 Configuration of Device 200

Figure 4:
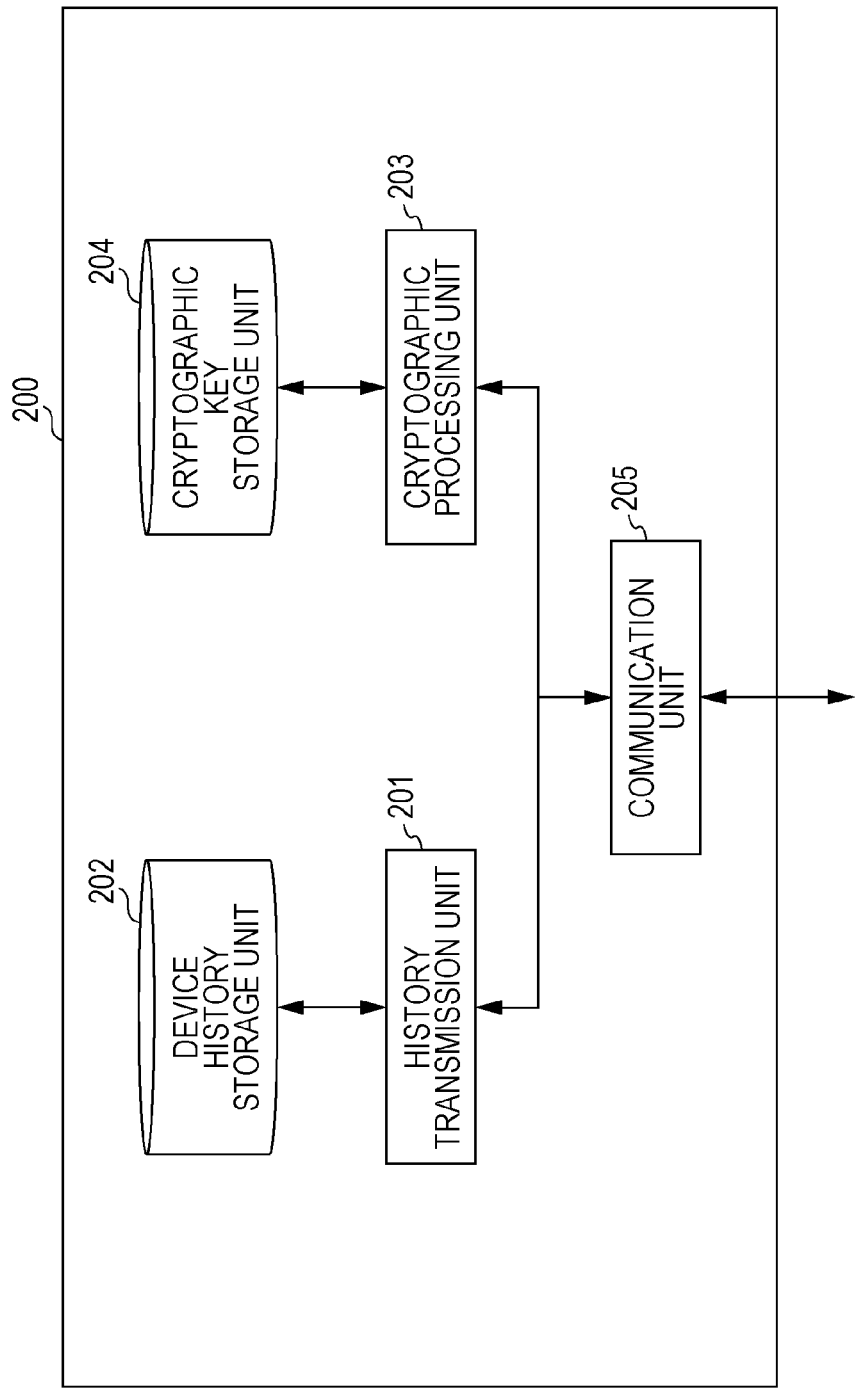
FIG. 4 is a diagram illustrating a configuration of a device according to the first embodiment.

FIG. 4 is a diagram illustrating a configuration the device 200. The device 200 includes a history transmission unit 201, a device history storage unit 202, a cryptographic processing unit 203, a cryptographic key storage unit 204, and a communication unit 205.

The history transmission unit 201 transmits a connection request to the home gateway 100 when the device 200 is started. Furthermore, the history transmission unit 201 transmits device history stored in the device history storage unit 202 to the cloud server 300 periodically or not periodically.

The device history storage unit 202 acquires device history and stores the acquired device history.

The cryptographic processing unit 203 performs a key exchange process necessary to make a connection to the home gateway 100. When the cryptographic processing unit 203 receives a random number for use in verification from the home gateway 100, the cryptographic processing unit 203 performs a cryptographic process using a cryptographic key with a short key length stored in the cryptographic key storage unit 204. In this cryptographic process, for example, a signature for the received random number is generated. The cryptographic processing unit 203 transmits the generated signature to the home gateway 100 via the communication unit 205. Furthermore, the cryptographic processing unit 203 performs a key exchange process, with the home gateway 100. The cryptographic processing unit 203 stores the shared key shared with the home gateway 100 in the cryptographic key storage unit 204 and the communication unit 205.

The cryptographic key storage unit 204 stores two or more public key pairs with different key lengths. For example, in a case where public key pairs are of elliptic curve cryptography, secret keys of the public key pairs stored may have key lengths of 80 bits, 160 bits, 192 bits, 224 bits, 256 bits, and the like. The cryptographic key storage unit 204 also stores a root public key certificate for use in verification of a public key certificate.

The communication unit 205 communicates with the home gateway 100. As for the cryptographic key used in encrypted communication with the home gateway 100, the shared key shared by the cryptographic processing unit 203 via the key exchange is used.

1.4 Configuration of Cloud Server 300

Figure 5:
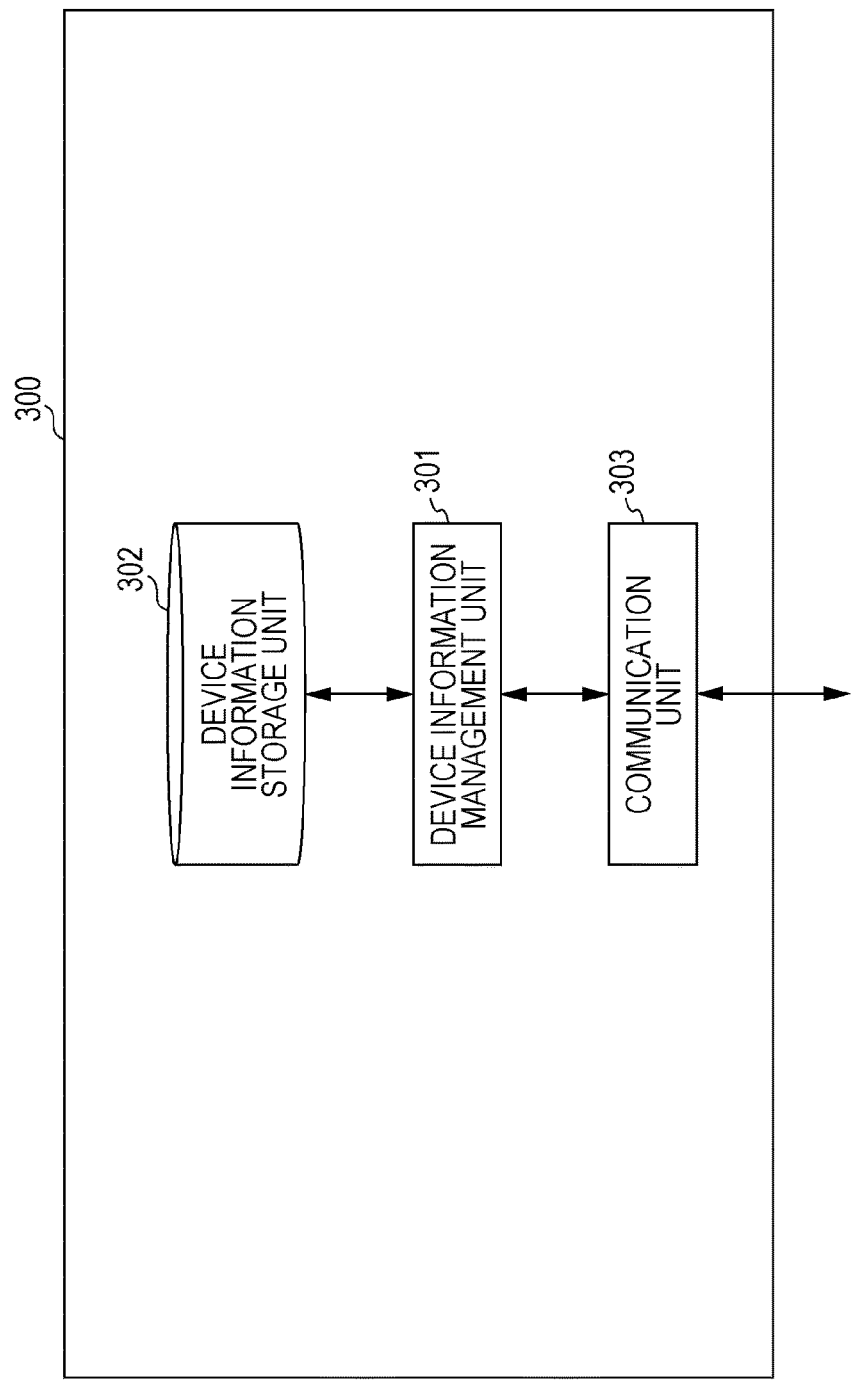
FIG. 5 is a diagram illustrating a configuration of a cloud server according to the first embodiment.

FIG. 5 is a configuration diagram of the cloud server 300. The cloud server 300 includes a device information management unit 301, a device information storage unit 302, and a communication unit 303.

The device information management unit 301 controls the device information storage unit 302 to manage device histories, connection methods between the home gateway 100 and the device 200 (hereinafter also referred to as a key exchange method).

The device information storage unit 302 stores IDs of the home gateway 100 and the devices 200, connection methods between the home gateway 100 and the devices 200, and device histories. FIG. 6 is a diagram illustrating an example of a device history information table. In this example, it is described in the device history information table that the home gateway having a ID of HGWID1 is connected to devices having device ID1 to device ID3, the key exchange with the device ID1 is performed using 160-bit ECDH, and the history information of the device ID1 is stored in history information 1.

The communication unit 303 communicates with the home gateway 100. In the communication with the home gateway 100, SSL communication is performed. A certificate necessary for the SSL communication is stored in the communication unit 303.

1.5. Operation of Cryptographic Communication System 10

The operation of the cryptographic communication system 10 includes the following.

(1) Device registration process in which a device 200 is connected to the home gateway 100 and the device 200 is registered in the cloud server 300 (2) Process of transmitting device history information from the device 200 to the cloud server (3) Process of updating the connection method between the device 200 and the home gateway 100

Each process is described below with reference to figures.

1.5.1 Operation of in Device Registration Process

Figure 7:
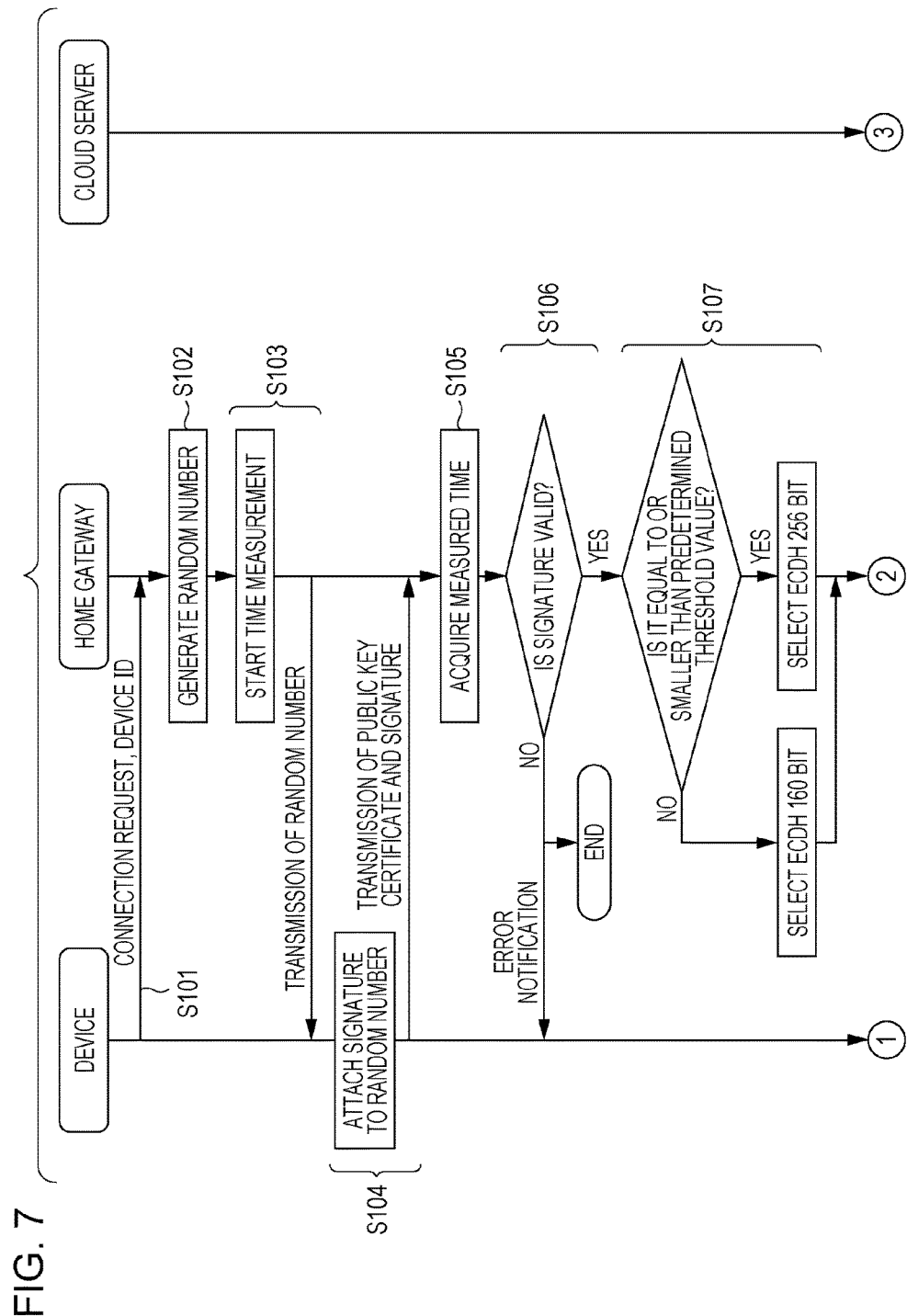
FIG. 7 is a diagram of a device registration sequence according to the first embodiment.
Figure 8:
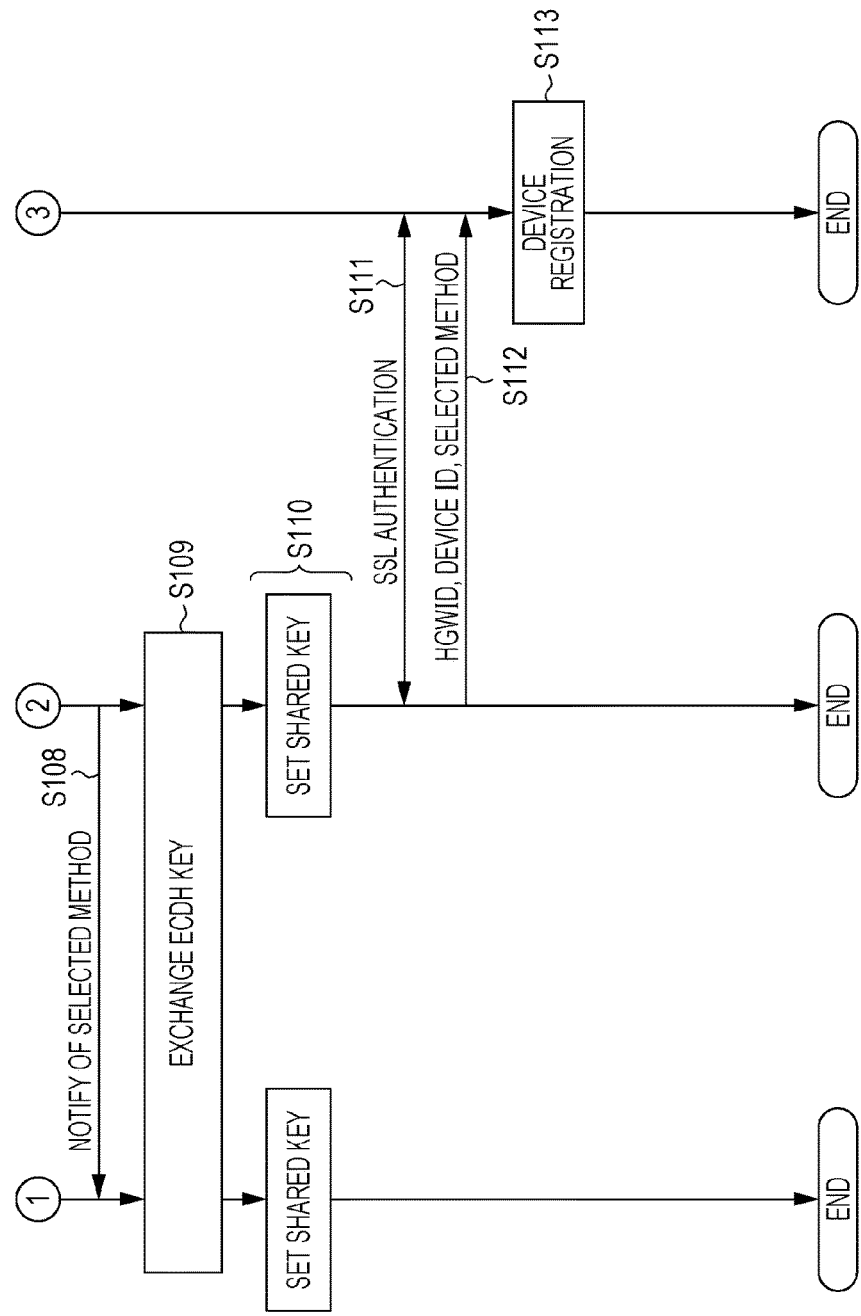
FIG. 8 is a diagram of a device registration sequence according to the first embodiment.

FIG. 7 and FIG. 8 illustrate a processing sequence in which a device 200 is connected to the home gateway 100 and is registered in the cloud server 300.

(S101) A device 200 transmits a connection request to the home gateway 100. At the same time, the device 200 also transmits a device ID of the device 200 together with the connection request.

(S102) When the home gateway 100 receives the connection request from the device 200, the home gateway 100 generates a random number for use in verifying the capability of the device 200.

(S103) The home gateway 100 starts the time measurement and transmits the random number to the device 200.

(S104) When the device 200 receives the random number from the home gateway 100, a cryptographic process is performed using a cryptographic key with a short key. In this cryptographic process, a signature for the received random number is generated. For example, in a case where a secret key of elliptic curve cryptography is possessed, the signature is generated using ECDSA (Elliptic Curve Digital Signature Algorithm). A further detailed description of ECDSA is not given here. However, the cryptographic process is not limited to that described above, but encryption may be performed. The device 200 transmits the generated signature and a public key certificate to the home gateway 100.

(S105) The home gateway 100 receives the signature from the device 200, stops the time measurement and acquires the processing time indicating the time spent to perform the process.

(S106) The home gateway 100 verifies the signature using the received public key certificate. In a case where the signature is not valid, the home gateway 100 returns an error notification to the device 200 and ends the process. Alternatively, the public key certificate may be verified. In this case, the verification of the public key certificate is performed using a root public key certificate stored in the cryptographic key storage unit 104.

(S107) The home gateway 100 determines whether the acquired processing time is equal to or lower than a predetermined threshold value. In a case where the processing time is equal to or shorter than the predetermined threshold value, the home gateway 100 determines that the processing capability of the device 200 is high, and the home gateway 100 selects a high-security key exchange method. Herein it is assumed by way of example that 256-bit ECDH is selected. On the other hand, in a case where the acquired measurement time is longer than the predetermined threshold value, the home gateway 100 determines that the processing capability of the device is low, and the home gateway 100 selects a key exchange method that is not high in security level but that allows a high-speed processing speed. Herein it is assumed by way of example that 160-bit ECDH is selected.

(S108) The home gateway 100 notifies the device 200 of the selected key exchange method.

(S109) The home gateway 100 and the device 200 perform a key exchange using the selected key exchange method to acquire a shared key. For example, the key exchange is performed using ECDH method.

(S110) The home gateway 100 and the device 200 set the key shared via the key exchange.

(S111) The home gateway 100 and the cloud server 300 perform SSL authentication and establish a cryptographic communication channel.

(S112) The home gateway 100 notifies the cloud server 300 of the ID of the home gateway 100, the device ID of the device 200 connected to the home gateway 100, and the selected key exchange method.

(S113) The cloud server 300 registers the ID of the home gateway 100, the device ID, and the selected key exchange method.

1.5.2 Operation of Transmitting Device History Information from the Device 200 to the Cloud Server 300

Figure 9:
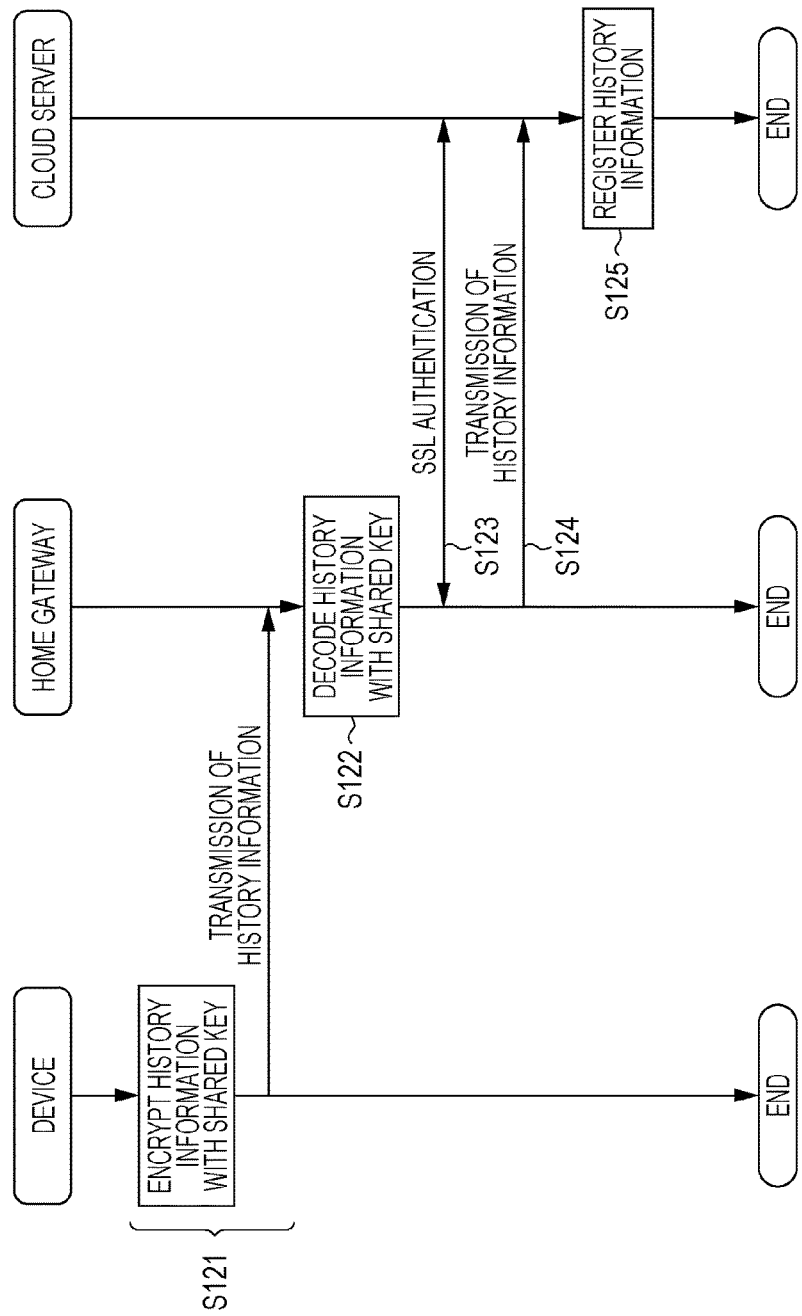
FIG. 9 is a sequence diagram of a process of transmitting history information according to the first embodiment.

FIG. 9 illustrates a sequence of transmitting device history information from a device to the cloud server. Note that this uploading is performed periodically or non-periodically.

(S121) The device 200 encrypts the collected device history information with the shared key and transmits the encrypted device history information together with the device ID to the home gateway 100.

(S122) When the home gateway 100 receives the device ID and the encrypted device history information, the home gateway retrieves the shared key from the device ID and decrypts the device history information using the shared key.

(S123) SSL authentication is performed between the home gateway 100 and the cloud server 300 and a cryptographic communication channel is established.

(S124) The home gateway 100 transmits to the cloud server 300 the ID of the home gateway 100, the device ID received from the device 200, and the device history information.

(S125) The cloud server 300 registers the ID of the home gateway 100, the device ID, and the device history information, received from the home gateway 100.

1.5.3 Process of Updating the Connection Method Between the Device 200 and the Home Gateway 100

Figure 10:
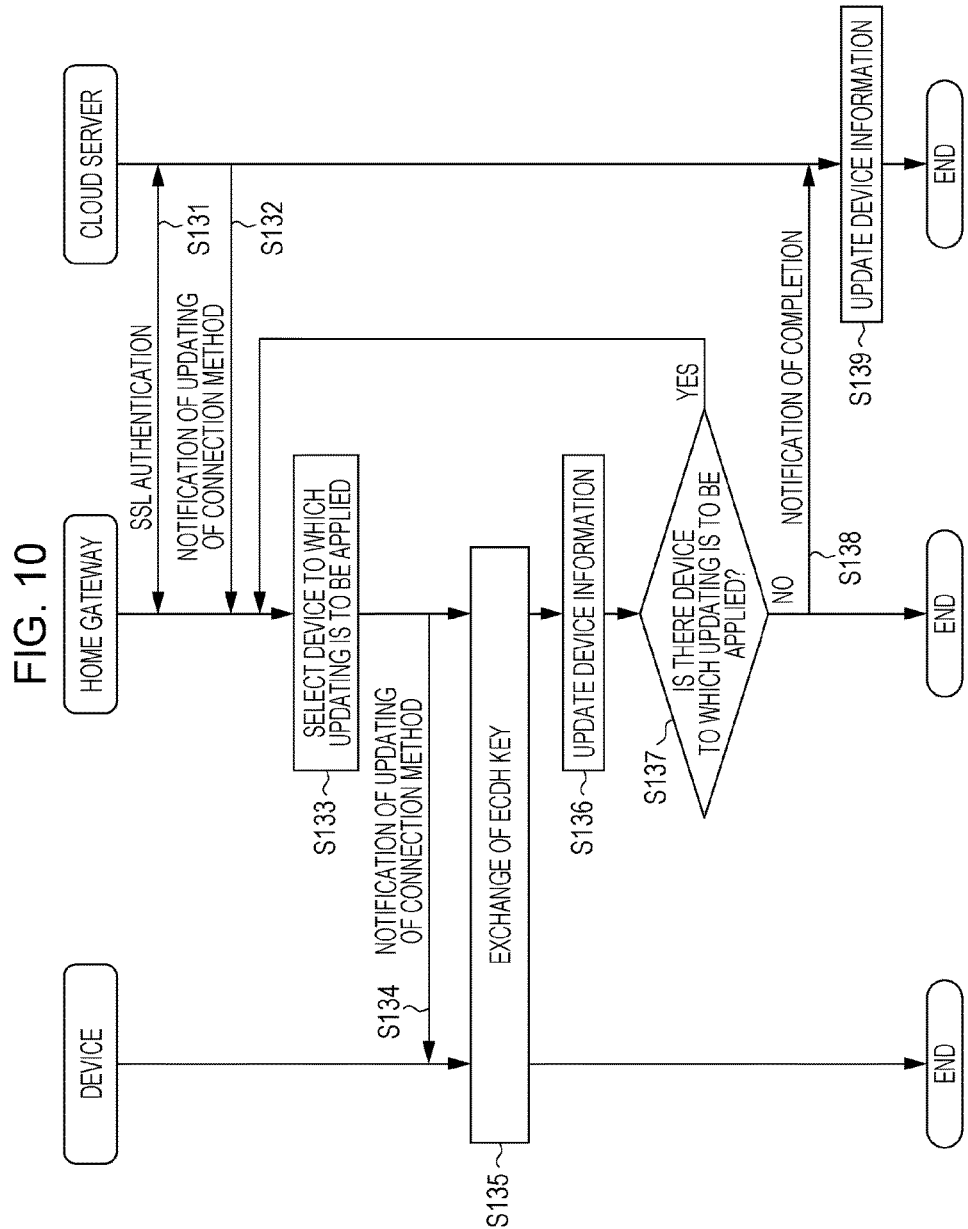
FIG. 10 is a sequence diagram of updating a connection method according to the first embodiment.

FIG. 10 is a diagram illustrating a processing sequence of updating the connection method of the connection between device 200 and the home gateway 100. Note that updating of the connection method is performed as required. For example, when an increase in a calculation capability of a computer such as a personal computer is achieved and thus the security level of the key exchange method hitherto selected is imperiled, the updating of the connection method may be performed.

(S131) SSL authentication is performed between the home gateway 100 and the cloud server 300, and a cryptographic communication channel is established.

(S132) The cloud server 300 notifies the home gateway 100 of updating of the connection method. More specifically, in the following description, it is assumed by way of example that a notification of updating from 160-bit ECDH to 256-bit ECDH is issued.

(S133) The home gateway 100 selects a device 200 to which the updating is to be applied. For example, in FIG. 3, a device ID1 is selected.

(S134) The home gateway 100 notifies the device 200 with the device ID1 of the updating of the connection method.

(S135) The home gateway 100 and the device 200 perform a key exchange using the selected key exchange method and acquire a shared key. Herein it is assumed by way of example that the key exchange is performed using 256-bit ECDH.

(S136) The home gateway 100 updates the information of the registered device 200 in terms of the key exchange method and the shared key.

(S137) The home gateway 100 determines whether there is a device 200 to which the updating is to be applied. In a case where there is a device 200 to which the updating is to be applied, the process is repeated from S133.

(S138) In a case where there is no device to which the updating is to be applied, the home gateway 100 transmits a completion notification to the cloud server 300.

(S139) When the cloud server 300 receives the completion notification from the home gateway 100, the cloud server 300 updates the device history information table.

FIG. 11 is a diagram illustrating an example of a device information management table for a case in which the home gateway 100 updates connection methods for all devices to which the updating is to be applied. The key exchange method for the device ID1 and device ID3 is updated to 256-bit ECDH and shared keys thereof are updated. For the device ID2, a 256-bit ECDH key exchange has already been performed, and thus updating of the shared key is not performed for the device ID2.

FIG. 12 is a diagram illustrating an example in which a completion notification is transmitted from the home gateway 100 to the cloud server 300 and a device history information table of the cloud server 300 is updated. In this example, it is seen in the device history information table that key exchange methods of devices 200 connected to the home gateway 200 with the ID of HGWID1 are updated to a high-security key exchange method.

1.6 Advantageous Effects of First Embodiment

In the first embodiment, when a device 200 is connected to a home gateway 100, a connection method is selected depending on the processing capability of the device 200. Thus, when the processing capability of the device is high, it is possible to select a high-security connection method. Furthermore, the connection method is allowed to be updated and thus in a case where an attacker gains a higher analysis capability, the connection method is changed to a high-security connection method to achieve a high-security connection between the home gateway 100 and the device 200.

Second Embodiment

2. System Configuration

A cryptographic communication system 11 according to an embodiment of the present disclosure is described below with reference to drawings.

In the cryptographic communication system 11 according to the second embodiment, firmware of the home gateway and that of devices are updated such that it becomes impossible to change a high-security connection method to a not-high-security connection method thereby maintaining the high-security connection method.

2.1 Overall Configuration of Cryptographic Communication System 11

The overall configuration of the authentication system 11 according to the second embodiment is similar to that according to the first embodiment and thus a description thereof is omitted here. In the second embodiment, a home gateway is denoted by 100*a*, a device is denoted by 200*d*, and a cloud server is denoted by 300*a*. Constituent elements having functions similar to those according to the first embodiment are denoted by similar reference numerals and a further description thereof is omitted.

2.2 Configuration of Home Gateway 100*a*

Figure 13:
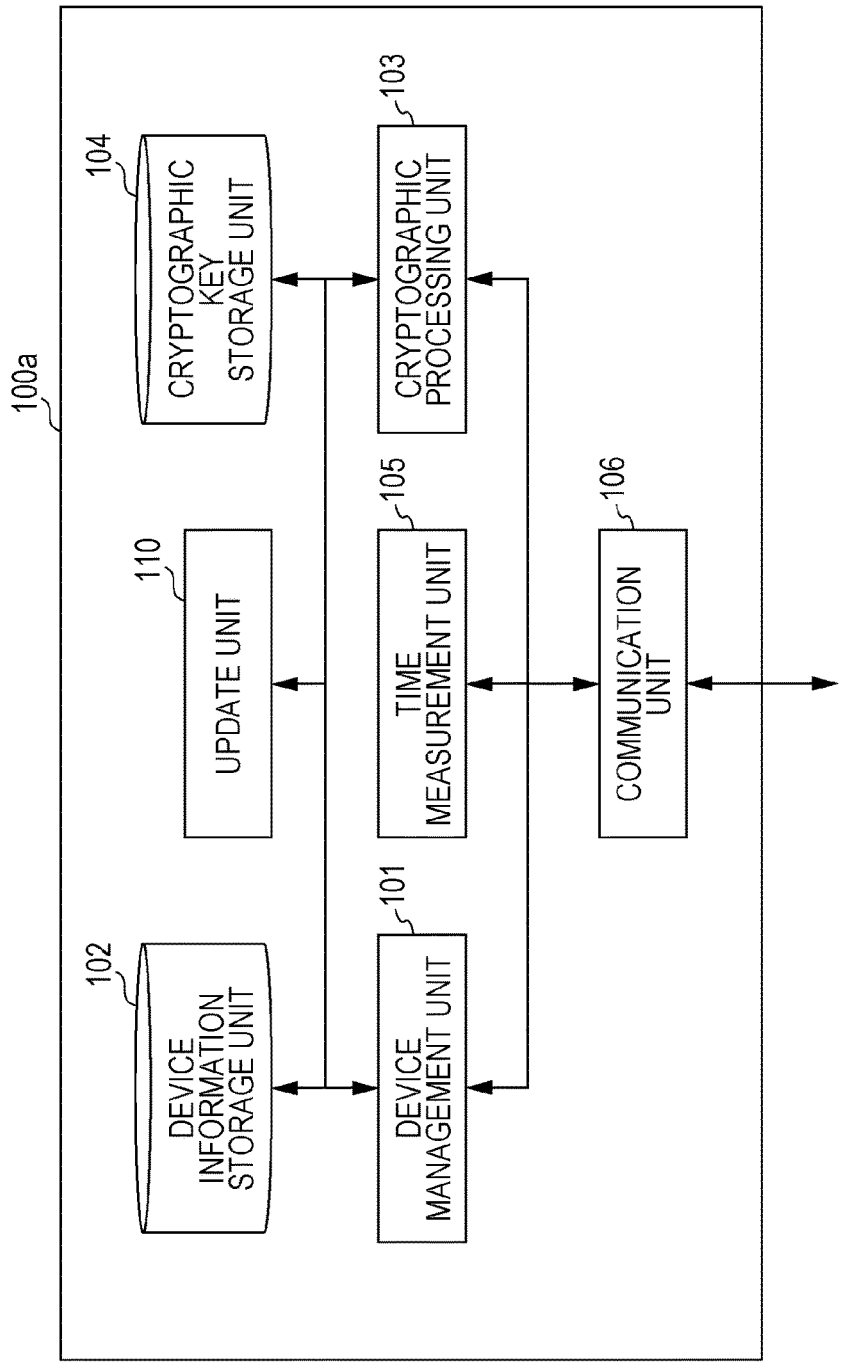
FIG. 13 is a diagram illustrating a configuration of a home gateway according to a second embodiment.

FIG. 13 is a diagram illustrating a configuration of the home gateway 100*a* according to the second embodiment. The home gateway 100*a* further includes an update unit 110 in addition to the configuration according to the first embodiment.

The update unit 110 updates the cryptographic processing unit 103. More specifically, the firmware is updated to that received from the cloud server 300*a* such that it becomes impossible to select a key exchange method with a short key length. In this updating process, public key pairs with short key lengths may be deleted from the cryptographic key storage unit 104.

FIG. 14 illustrates a device information management table according to the second embodiment. The device information management table further includes a field of update information in addition to fields of the device information management table according to the first embodiment. The update information indicates whether updating of firmware is completed and whether updating of a shared key is completed.

2.3 Configuration of Device 200*d*

Figure 15:
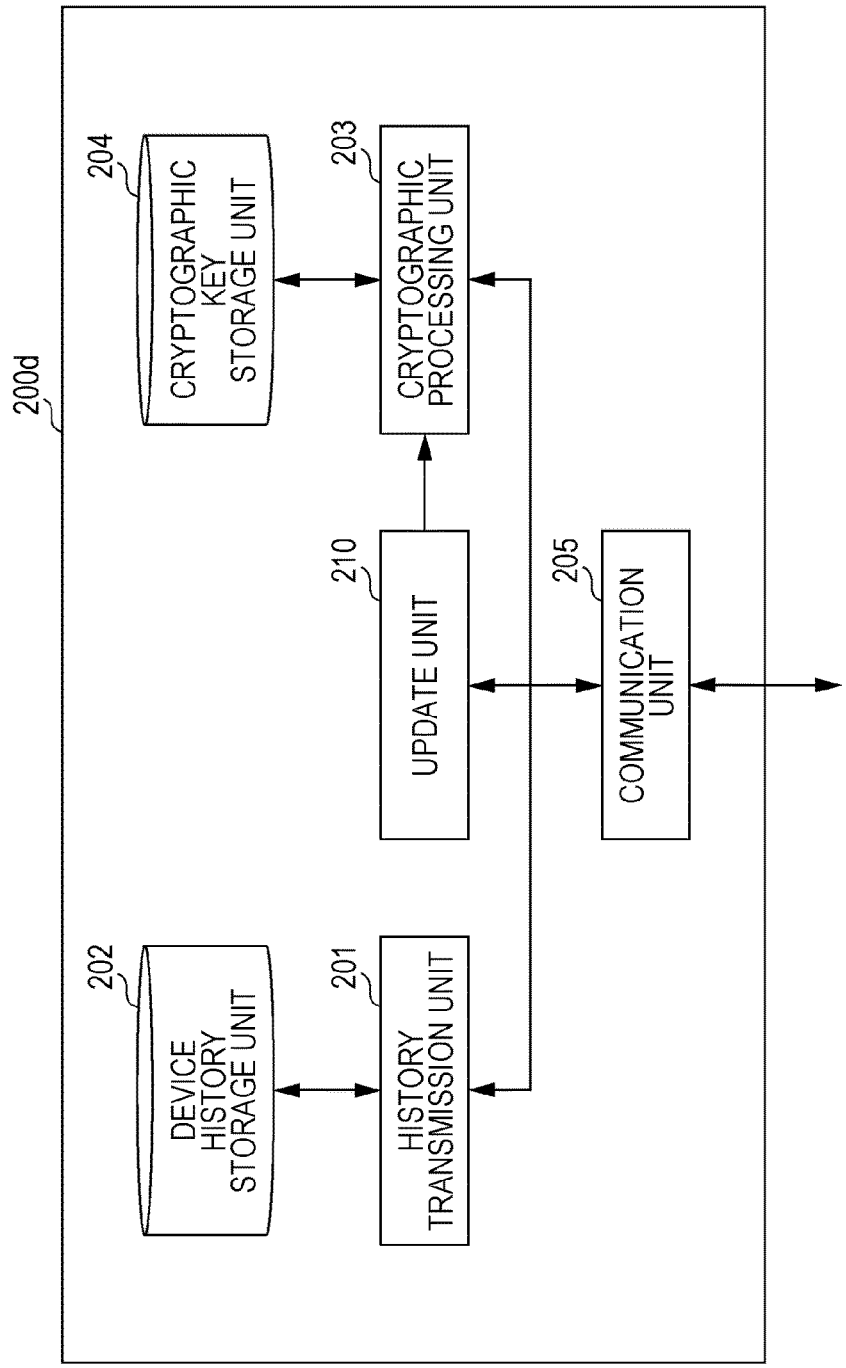
FIG. 15 is a diagram illustrating a configuration of a device according to the second embodiment.

FIG. 15 is a configuration diagram of the device 200*d* according to the second embodiment. The device 200*d* further includes an update unit 210 in addition to the configuration according to the first embodiment.

The update unit 210 updates the cryptographic processing unit 203. More specifically, the firmware is updated to that received from the home gateway such that it becomes impossible to select a key exchange method with a short key length. In this updating process, public key pairs with short key lengths may be deleted from the cryptographic key storage unit 204.

2.4 Configuration of Cloud Server 300*a*

Figure 16:
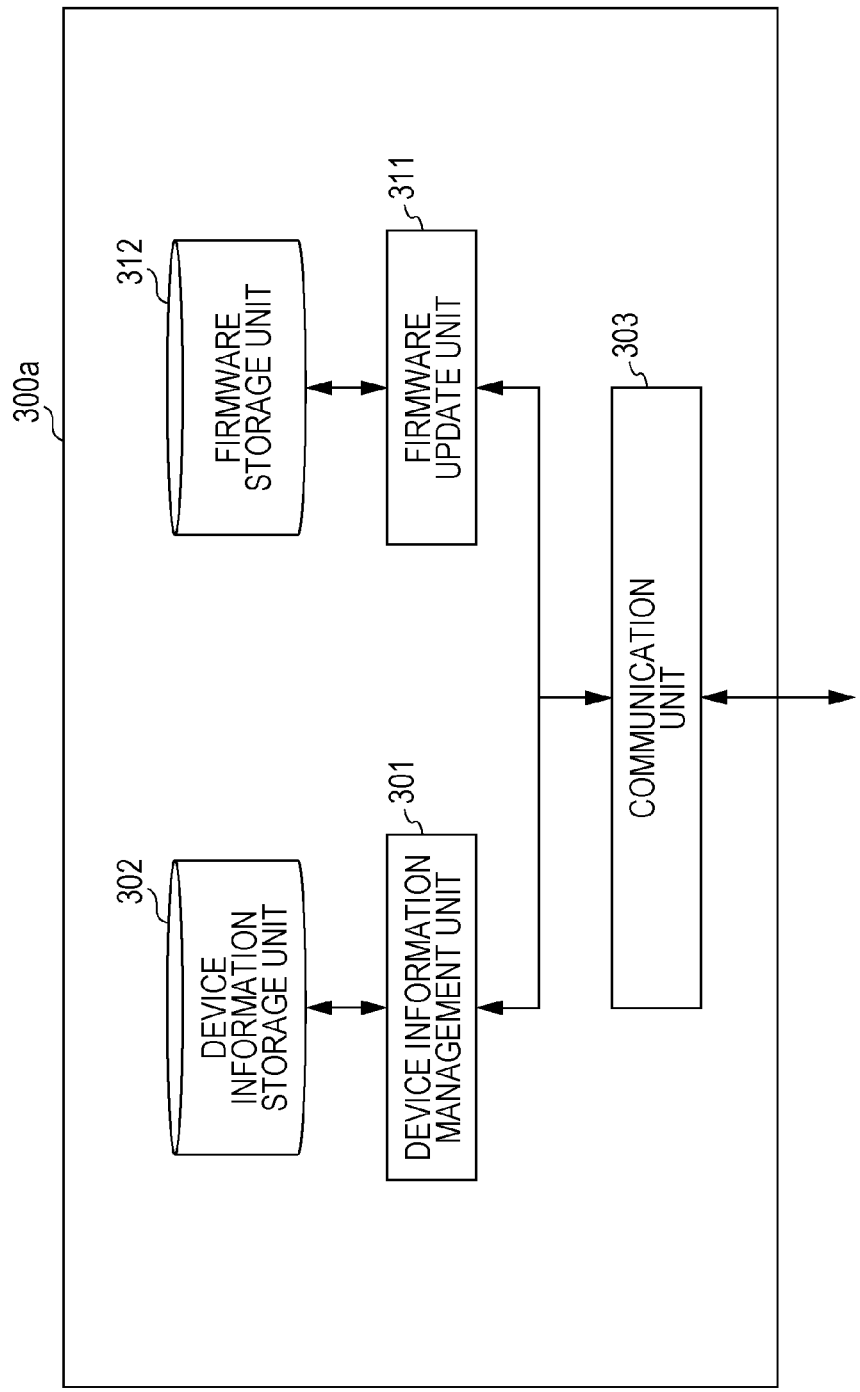
FIG. 16 is a diagram illustrating a configuration of a cloud server according to the second embodiment.

FIG. 16 is a configuration diagram of the cloud server 300*a*. The cloud server 300*a* further includes a firmware update unit 311 and a firmware storage unit 312 in addition to the configuration of the cloud server 300 according to the first embodiment.

The firmware update unit 311 transmits commands to update the home gateway 100*a* and the device 200*d*.

The firmware storage unit 312 stores firmware of the home gateway 100*a* and that of the device 200*d*.

FIG. 17 illustrates a device history information table according to the second embodiment. The device history information table further includes a field of update information in addition to the fields of the device history information table according to the first embodiment. The update information indicates whether updating of firmware is completed and whether updating of a shared key is completed.

2.5 Operation of Cryptographic Communication System 11

The operation of the cryptographic communication system 11 includes the following.

(1) Device registration process in which the device 200*d* is connected to the home gateway 100*a* and the device 200*d* is registered in the cloud server 300*a* (2) Process of transmitting device history information from the device 200*d* to the cloud server 300*a* (3) Process of updating firmware of the device 200*d* and the home gateway 100*a* Processes of (1) and (2) are similar to those according to the first embodiment, and thus a description thereof is omitted here.

Each process is described below with reference to figures.
2.5.1 Operation in the Process of Updating Firmware of the Device 200*d* and the Home Gateway 100*a*

Figure 18:
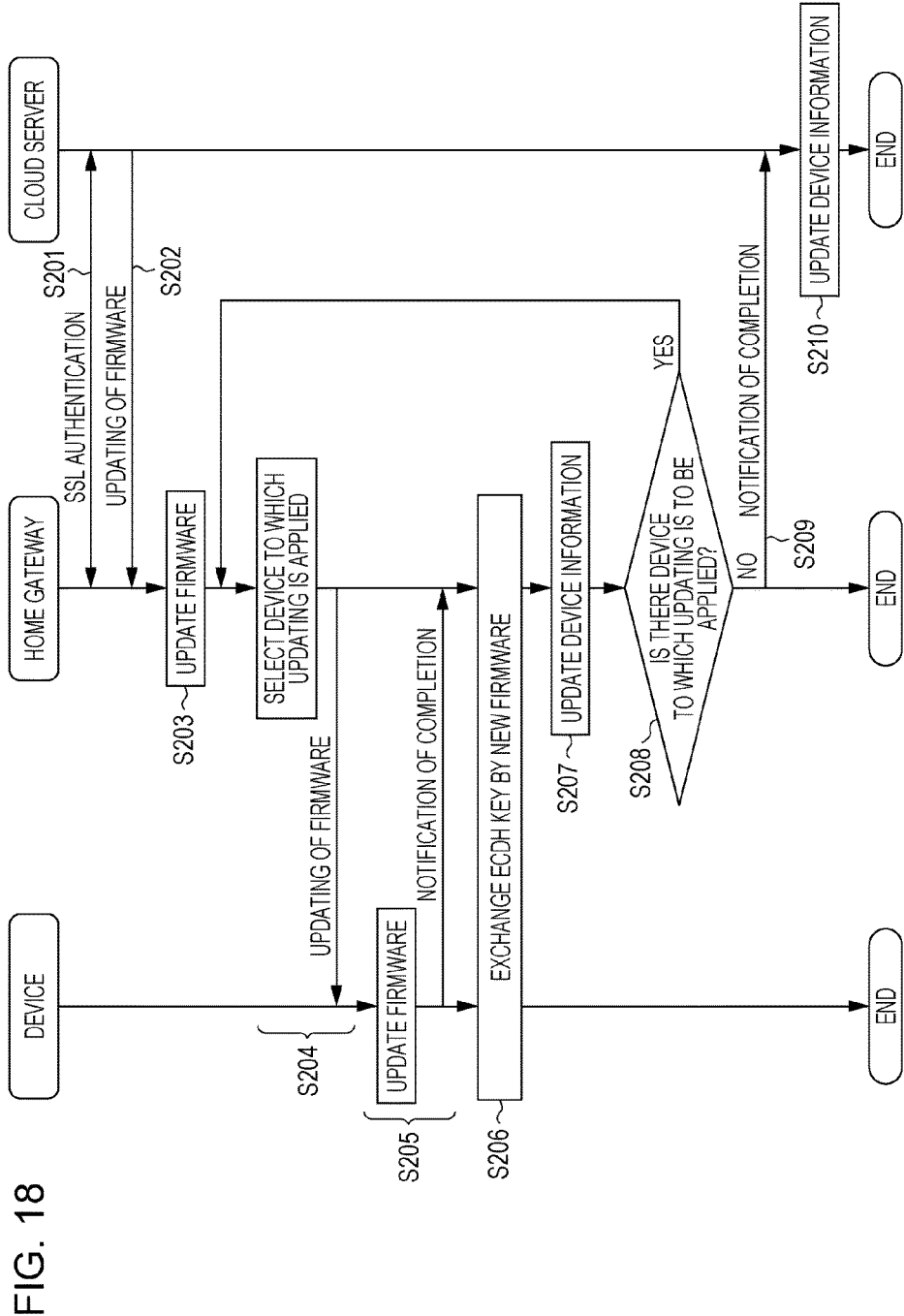
FIG. 18 is a sequence diagram of updating firmware according to the second embodiment.

FIG. 18 is a diagram illustrating a processing sequence of updating firmware for updating the connection method between the device 200*d* and the home gateway 100*a*. Note that updating of the connection method is performed as required. For example, when an increase in a calculation capability of a computer such as a personal computer is achieved and thus the security level of the key exchange method hitherto selected is imperiled, the updating of the connection method may be performed.

(S201) SSL authentication is performed between the home gateway 100*a* and the cloud server 300*a*, and a cryptographic communication channel is established.

(S202) The cloud server 300*a* notifies the home gateway 100*a* of updating of firmware. At the same time, firmware of the home gateway 100*a* and that of the device 200*d* are also transmitted. More specifically, in the following description, it is assumed by way of example that a notification of updating firmware to change 160-bit ECDH to 256-bit ECDH is issued.

(S203) When the home gateway 100*a* receives the firmware from the cloud server 300*a*, the home gateway 100*a* updates the firmware of the home gateway 100*a*.

(S204) The home gateway 100*a* selects a device 200*d* to which the updating is to be applied, and the home gateway 100*a* notifies the device 200*d*, to which the updating is to be applied, of the updating of the connection method.

(S205) When the device 200*d* receives the firmware from the home gateway 100*a*, the device 200*d* updates the firmware of the device 200*d*. After the updating of the firmware is complete, the device 200*d* transmits an update completion notification to the home gateway 100*a*.

(S206) The home gateway 100*a* and the device 200*d* perform a key exchange method by the updated firmware and acquire a shared key. Herein it is assumed by way of example that the key exchange is performed using 256-bit ECDH.

(S207) The home gateway 100*a* updates the information of the registered device 200*d* in terms of the key exchange method, the shared key, and the update information.

(S208) The home gateway 100*a* determines whether there is a device 200*d* to which the updating is to be applied. In a case where there is a device 200*d* to which the updating is to be applied, the process is repeated from S204.

(S209) In a case where there is no device 200*d* to which the updating is to be applied, the home gateway 100*a* transmits a completion notification to the cloud server 300*a*.

(S210) When the cloud server 300*a* receives the completion notification from the home gateway 100*a*, the cloud server 300*a* updates the device history information table.

FIG. 19 is a diagram illustrating an example of a device information management table for a case in which the home gateway 100*a* updates connection methods for all devices 200*d* to which the updating is to be applied. In this example, it is seen from the device information management table that All firmware is updated, the key exchange method for the device ID1 and device ID3 is updated to 256-bit ECDH, and the shared keys and the update information are updated. For the device ID2, a 256-bit ECDH key exchange has already been performed, and thus updating is performed only in terms of firmware but the shared key is not updated.

FIG. 20 is a diagram illustrating an example in which a completion notification is transmitted from the home gateway 100*a* to the cloud server 300*a* and a device history information table of the cloud server 300*a* is updated. In this example, it is seen from the device history information table that the firmware of the devices 200*d* connected to the home gateway 100*a* with the ID of HGWID1 is updated, and a high-security key exchange method is set.

2.6 Advantageous Effects of Second Embodiment

In the second embodiment, firmware of the home gateway 100*a* and that of devices 200*d* are updated so as to disable a public key pair with a short key length in the home gateway 100*a* and the devices 200*d* thereby making it possible to prevent a connection from being made using a not-high-security connection method. Thus, in a case where an attacker gains a higher analysis capability, the connection method is changed to a high-security connection method to achieve a high-security connection between the home gateway 100*a* and the device.

3. Other Modifications

Although the present disclosure has been described above with reference to embodiments, the present disclosure is not, as a matter of course, limited to the embodiments described above. The present disclosure also includes in its scope the following.

(1) In the first embodiment described above, when the process of updating the connection method between a device and a home gateway is performed, a notification of updating of the connection method is first transmitted from the home gateway to the device and then a key exchange by a new method is performed. However, the process is not limited to the manner described above. When the device receives the update notification, the key exchange may not be performed immediately but may be performed when a particular period of time has elapsed. In this case, a notification is sent from the device to the home gateway to notify that the key exchange is not to be performed. The currently shared key is further used until the key exchange is performed. FIG. 21 is a diagram illustrating an example of a device information management table in a state before the key exchange is performed. In this example, it is seen from the device information management table that a notification of updating of a connection method is issued to a device with a device ID1 but updating of a shared key is not yet performed. In a case where the key exchange is performed after a particular period has elapsed, the device in terms of processing state may be checked and the key exchange may be performed when main processing functions of the device is not influenced.

By performing the key exchange not immediately but at a later time taking into the account the processing state of the device, it is possible to improve the security level without reducing the convenience for a user who uses the device.

(2) In the second embodiment described above, when the process of updating the firmware of a device and a home gateway is performed, a notification of updating of the firmware is first transmitted from the home gateway to the device and then the firmware is updated and a key exchange by a new method is performed. However, the process is not limited to the manner described above. When the firmware of the device is updated, the key exchange may not be performed immediately. In this case, a notification is sent from the device to the home gateway to notify that the key exchange is not to be performed. The currently shared key is further used until the key exchange is performed. FIG. 22 is a diagram illustrating an example of a device information management table in a state before the key exchange is performed. In this example, it is seen from the device information management table that a notification of updating of firmware is sent to a device with a device ID1 and the firmware is updated, but updating of a shared key is not yet performed. In a case where the key exchange is performed after a particular period has elapsed, the device in terms of processing state may be checked and the key exchange may be performed when main processing functions of the device is not influenced.

By performing the key exchange not immediately but at a later time taking into the account the processing state of the device, it is possible to improve the security level without reducing the convenience for a user who uses the device. Furthermore, by updating the firmware, it is possible to prevent a not-high-security public key pair with a short key length from being used in making a new connection.

(3) In the embodiments described above, when the process of registering a device is performed, a signature is generated by the device and the signature is verified by the home gateway. However, the process is not limited to the manner described above. but a cryptographic process may be performed using a public key pair. More specifically, a public key pair with a short key length for use in common may be possessed by all devices and the home gateway, a device may encrypt a random number received by the home gateway and may transmit the encrypted random number to the home gateway. The home gateway may decrypt the received encrypted random number and may verify it.

(4) In the embodiments described above, a difference may be taken into account in terms of network that connects a home gateway and a device The processing time spent until the verification result is received since the home gateway sends the verification process to the device may further include, in addition to a processing time actually spent by the device, a time taken for data to reach the device via the network from the home gateway and a time taken for the data to reach the home gateway from the device. This time may vary depending on the network type.

Figure 23:
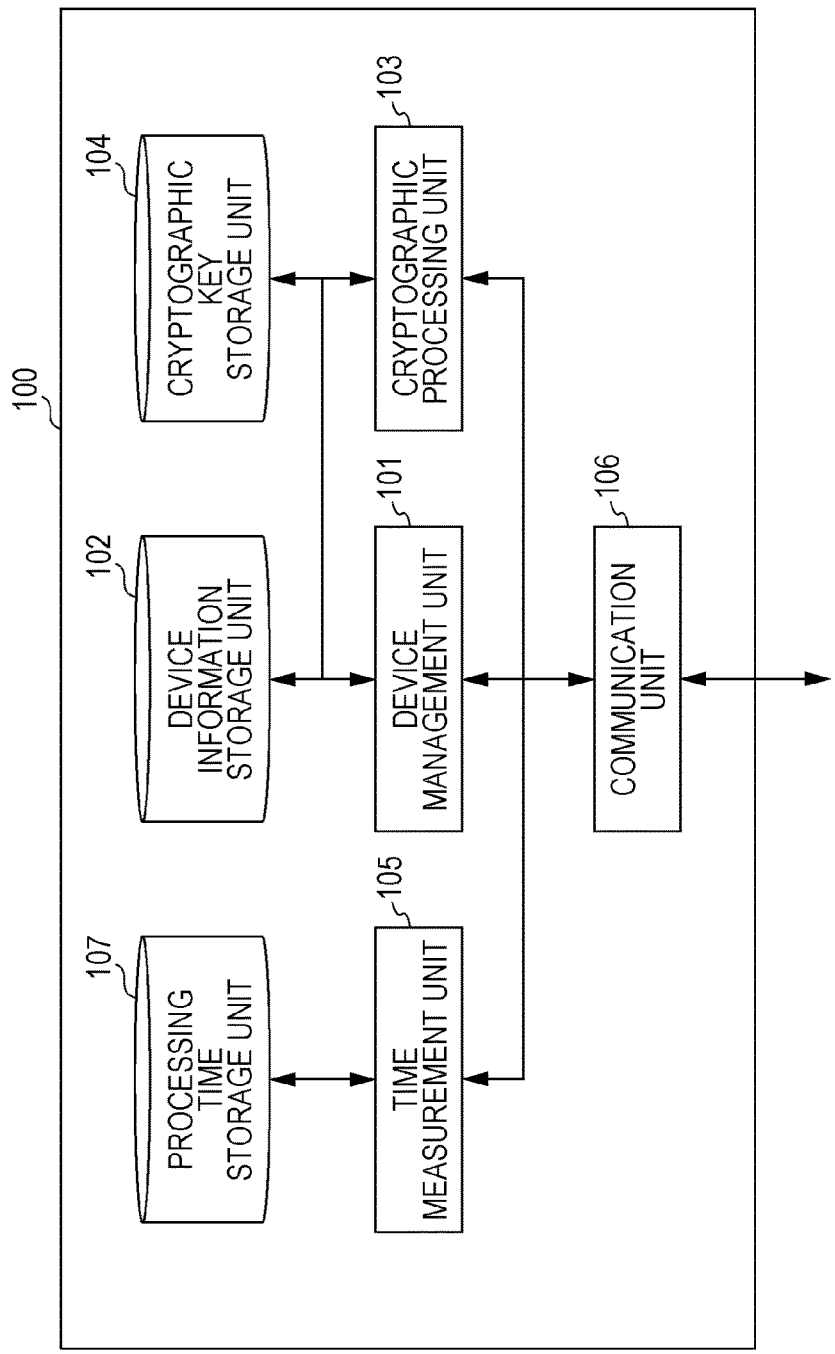
FIG. 23 is a diagram illustrating a configuration of a home gateway according to a fourth modification.

FIG. 23 is a diagram illustrating a configuration of a home gateway. The home gateway illustrated in FIG. 23 further includes a processing time storage unit 107 in addition to the configuration of the home gateway according to the first embodiment illustrated in FIG. 2. The processing time storage unit 107 stores a standard processing time table indicating a standard value of the processing time individually for each network type. FIG. 24 is a diagram illustrating an example of a standard processing time table. In this example, it is assumed that the standard processing time values for the Ethernet®, Wi-Fi, and specified low power radio are respectively 500 msec, 1000 msec, and 1500 msec. These values may be determined in advance depending on the characteristics of the networks. Note that the specified low power radio is a simple wireless communication system used in Japan that uses a weak radio wave and that is allowed to be used without a license. Examples of similar systems include FRS (Family Radio Service) in the USA, PMR446 (Personal Mobile Radio, 446 MHz) in Europe, and the like.

FIG. 25 is a diagram illustrating an example of a device information management table. The device information management table further includes a field of network type in addition to the fields of the device information management table according to the first embodiment. In this example, it is seen from the device information management table that a device with a device ID of ID1 is connected to the home gateway via Ethernet®.

The home gateway refers to the device information management table illustrated in FIG. 25 to retrieve a network type corresponding to a device ID received from a device. The home gateway further refers to the standard processing time table in FIG. 24 to retrieve a standard processing time value corresponding to the retrieved network type. The home gateway employs the retrieved standard processing time value as the threshold value and compares the processing time acquired via the time measurement unit with the standard processing time value. In a case where the processing time is equal to or shorter than the standard processing time value, the home gateway determines that the processing capability of the device is high, and thus the home gateway selects a key exchange method that provides a high security level. On the other hand, in a case where the processing time is longer than the standard processing time value, the home gateway determines that the processing capability of the device is low, and the home gateway 100 selects a key exchange method that is not high in security level but that allows a high-speed processing speed.

Note that as for the standard processing time table in FIG. 24, a plurality of standard processing time tables may be provided individually for respective device types. For example, standard processing time tables may be provided individually for respective device object classes of ECHONET Lite.

(5) In the embodiments described above, a candidate for the key exchange method is selected from two or more public key pairs having different key lengths and using the same cryptographic algorithm. However, the manner of selecting the key exchange method is not limited to that described above. For example, a processing load is evaluated in advance for each of two or more public key pairs having a different combination of a cryptographic algorithm and a key length, and one of the two or more public key pairs may be selected depending on a measured processing time.

(6) A specific example of each apparatus described above is a computer system including a microprocessor, a ROM, a RAM, a hard disk unit, a display unit, a keyboard, a mouse, and the like. A computer program is stored in the RAM or the hard disk unit. In each apparatus, the microprocessor operates according to the computer program thereby achieving the function of the apparatus. The computer program is a combination of a plurality of instruction codes indicating instructions that are given to the computer to achieve a particular function.

(7) Part or all of the constituent elements of each apparatus described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI.

Each of the constituent elements of each apparatus described above may be integrated separately on a single chip, or part of all of the apparatus may be integrated on a single chip.

Although in the above description, the term system LSI is used, it is also called a IC, a LSI, a super LSI, or an ultra LSI depending on the integration density. The method of implementing the integration circuit is not limited to the LSI, but the integrated circuit may be implemented in the form of a dedicated circuit or a general-purpose processor. Alternatively, the LSI may be implemented in the form of an FPGA (Field Programmable Gate Array) that allows programming to be performed after the LSI is produced, or the LSI may be implemented in the form of a reconfigurable processor that allows it to reconfigure interconnections among circuit cells in the LSI or reconfigure setting.

As a matter of course, if a progress of a semiconductor technology or another technology derived therefrom provides a new technology for realizing an integrated circuit which can replace the LSI, functional blocks may be integrated using the new technology. Use of biotechnology is potentially possible.

(8) Part or all of the constituent elements of each apparatus described above may be implemented in the form of a IC card attachable to the apparatus or in the form of a single module. The IC card or the module is a computer system including a microprocessor, a ROM, a RAM, and the like. The IC card or the module may include the super-multifunction LSI described above. In the IC card or the module, the microprocessor operates according to the computer program thereby achieving the function of the IC card or the module. The IC card or the module may be configured so as to be resistant against tampering.

(9) The present disclosure may be implemented as a method. The method may be realized by a computer program that is to be executed by a computer or the method may be realized by a digital signal associated with the computer program.

The present disclosure may be implemented by a computer readable storage medium, such as a flexible disk, a hard disk, a CD-ROM, a MO disk, a DVD disk, a DVD-ROM disk, a DVD-RAM disk, a BD (Blu-ray Disc), a semiconductor memory, or the like in which the computer program or the digital signal are stored. The digital signal may be recorded in the storage medium described above.

The present disclosure may be implemented by transmitting the computer program or the digital signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital signal may be stored in the storage medium and the storage medium may be transported, or the program or the digital signal may be transferred via the network or the like thereby allowing the present disclosure to be implemented in another computer system.

(10) The details of the above-described embodiments and the modifications may be combined.

According to the present disclosure, in a communication system in which a device and a home gateway are connected, it is possible to select a high-security connection method taking into account a processing capability of the device. In a case where it is predicted that the security level of the key exchange method is not high enough, it is possible to update the key exchange method to a high-security connection method.

What is claimed is:

1. A gateway apparatus that, in a communication system including a device and a gateway apparatus, communicates with the device by using a public key cryptography method, the gateway apparatus comprising:
   one or more memories;
   and circuitry which, in operation:
      stores a plurality of public key pairs each including a secret key and a public key corresponding to the secret key and having a different key length;
      transmits data for verification to the device to be registered;
      receives, from the device to be registered, information indicating a result of a cryptographic process using the data for verification;
      measures a processing time indicating a time spent until the information indicating the result of the cryptographic process is received since the data for verification is transmitted; and
      verifies whether or not the received information is valid,
   wherein in a case where the circuitry verifies that the received information is valid, one public key pair is selected from the plurality of public key pairs depending on the measured processing time, and the circuitry performs a key exchange with the device by the public key cryptography method using the selected one public key pair.

2. The gateway apparatus according to claim 1, wherein, in a case where the circuitry verifies that the received information is not valid, the circuitry does not perform the key exchange with the device and prevents a connection with the device.

3. The gateway apparatus according to claim 1, wherein the circuitry stores two public key pairs that are different in key length,
   and wherein, in a case where the measured processing time is longer than a predetermined time, the circuitry performs the key exchange with the device using a first public key pair having a first key length shorter than a second key length of a second public key pair of the two public key pairs, while in a case where the measured processing time is equal to or shorter than the predetermined time, the circuitry performs the key exchange with the device using the second public key pair having the second key length longer than the first key length of the first public key pair of the two public key pairs.

4. The gateway apparatus according to claim 1, wherein the cryptographic process is a process of performing a signature generation using a secret key having a shortest key length of the plurality of public key pairs.

5. The gateway apparatus according to claim 1, wherein the circuitry stores a public key pair that is for use in common by all devices and that has a key length longer than key lengths of the plurality of public key pairs, and the cryptographic process is a process of performing an encryption process using the public key pair for use in common by all devices.

6. The gateway apparatus according to claim 1, wherein the circuitry generates a shared key for use in common by the gateway apparatus and the device by the key exchange and stores the generated shared key.

7. The gateway apparatus according to claim 6, wherein in a case where firmware of the gateway apparatus is updated so as to prohibit communication by the public key cryptography method using the selected one public key pair, the circuitry continues communication by the public key cryptography method using the selected one public key pair until the shared key is deleted.

8. A cryptographic communication method for, in a communication system including a device and a gateway apparatus, controlling the gateway apparatus that communicates with the device using a public key cryptography method, the cryptographic communication method comprising:
   controlling a computer of the gateway apparatus so as to
      manage a plurality of public key pairs each including a secret key and a public key corresponding to the secret key and having a different key length,
      transmit data for verification to the device to be registered,
      receive, from the device to be registered, information indicating a result of a cryptographic process using the data for verification,
      measure a processing time indicating a time spent until the information indicating the result of the cryptographic process is received since the data for verification is transmitted, and
      verify whether or not the received information is valid,
   wherein in a case where the received information is verified as valid, one public key pair is selected from the plurality of public key pairs depending on the measured processing time, and a key exchange is performed with the device by the public key cryptography method using the selected one public key pair.

9. A non-transitory computer-readable storage medium storing a computer program that, in a communication system including a device and a gateway apparatus, controls the gateway apparatus that communicates with the device using a public key cryptography method, the computer program comprising controlling a computer of the gateway apparatus so as to
   manage a plurality of public key pairs each including a secret key and a public key corresponding to the secret key and having a different key length,
   transmit data for verification to the device to be registered,
   receive, from the device to be registered, information indicating a result of a cryptographic process using the data for verification,
   measure a processing time indicating a time spent until the information indicating the result of the cryptographic process is received since the data for verification is transmitted, and
   verify whether or not the received information is valid,
   wherein in a case where the received information is verified as valid, one public key pair is selected from the plurality of public key pairs depending on the measured processing time, and a key exchange is performed with the device by the public key cryptography method using the selected one public key pair.

* * * * *